(12) United States Patent
Fleischman et al.

(10) Patent No.: US 10,698,753 B2
(45) Date of Patent: Jun. 30, 2020

(54) MITIGATING DEVICE VULNERABILITIES IN SOFTWARE

(71) Applicant: Raytheon Company, Waltham, MA (US)

(72) Inventors: Scott Fleischman, Benson, AZ (US); Craig O. Shott, Benson, AZ (US); Kyle Solander, Broomfield, CO (US)

(73) Assignee: Ratheon Company, Waltham, MA (US)

( * ) Notice: Subject to any disclaimer, the term of this patent is extended or adjusted under 35 U.S.C. 154(b) by 193 days.

(21) Appl. No.: 15/958,789

(22) Filed: Apr. 20, 2018

(65) Prior Publication Data
US 2019/0324836 A1 Oct. 24, 2019

(51) Int. Cl.
*G06F 11/07* (2006.01)
*G06F 30/367* (2020.01)

(52) U.S. Cl.
CPC ...... *G06F 11/0736* (2013.01); *G06F 11/0793* (2013.01); *G06F 30/367* (2020.01)

(58) Field of Classification Search
CPC .................................................. G06F 11/008
USPC .................................................. 714/37, 47.3
See application file for complete search history.

(56) References Cited

U.S. PATENT DOCUMENTS

| | | | | |
|---|---|---|---|---|
| 6,336,035 B1 * | 1/2002 | Somoza | ............... | H04W 16/18 455/423 |
| 9,840,007 B1 * | 12/2017 | Kuffner | ............... | G05D 1/0088 |
| 10,431,106 B1 * | 10/2019 | Tolland | ............... | G06F 3/04842 |
| 2004/0040000 A1 * | 2/2004 | Taravade | ............ | G06F 17/5036 716/53 |
| 2005/0192915 A1 * | 9/2005 | Ahmed | .................... | G06N 3/02 706/21 |
| 2012/0290104 A1 * | 11/2012 | Holt | ....................... | G06Q 10/00 700/29 |
| 2012/0304007 A1 | 11/2012 | Hanks et al. | | |

(Continued)

FOREIGN PATENT DOCUMENTS

WO WO-2019204587 A1 10/2019

OTHER PUBLICATIONS

Hou et al., "Electric energy automobile body electromagnetic compatibility test method, involves repeating electromagnetic radiation quantity detection process until radiation and harmonic interference are", Jul. 18, 2017 (Year: 2017).*

(Continued)

*Primary Examiner* — Chae M Ko
(74) *Attorney, Agent, or Firm* — Schewegman Lundberg & Woessner, P.A.

(57) ABSTRACT

A method can include simulating, by at least one hardware processor, operation of an embedded device under a variety of conditions including a variety of electromagnetic interference (EMI) conditions and a variety of weather conditions, determining proper operation characteristics of the components based on the simulating, the proper operation characteristics of the components determined based on simulations that result in the embedded device operating properly, determining which components of the embedded device impact proper operation of the embedded device by a threshold amount, and programming the at least one hardware processor to implement a safeguard that ensures proper operation of a component of the components.

15 Claims, 4 Drawing Sheets

(56) References Cited

U.S. PATENT DOCUMENTS

| | | | |
|---|---|---|---|
| 2015/0060593 A1* | 3/2015 | Prince | B64C 5/12 |
| | | | 244/3.21 |
| 2016/0274990 A1* | 9/2016 | Addleman | G06F 11/3409 |
| 2016/0378583 A1* | 12/2016 | Nakano | G06F 11/0709 |
| | | | 714/37 |
| 2017/0082680 A1* | 3/2017 | Eck | G01R 31/2815 |
| 2017/0139411 A1* | 5/2017 | Hartung | G05D 1/0077 |
| 2018/0020018 A1 | 1/2018 | Walheim et al. | |
| 2018/0075538 A1* | 3/2018 | Konrardy | G06Q 40/08 |
| 2018/0357535 A1* | 12/2018 | Shulkin | G06N 3/08 |
| 2018/0373245 A1* | 12/2018 | Nishi | G05D 1/0088 |

OTHER PUBLICATIONS

"Definition for "embedded systems", p. 314", The "Official (ISC)2 Guide to the CISSP CBK", Fourth Edition, Auerbach Publications Boston, MA, (2015), 1 pg.
"International Application Serial No. PCT/US2019/028094, International Search Report dated Jul. 26, 2019", 4 pgs.
"International Application Serial No. PCT/US2019/028094, Written Opinion dated Jul. 26, 2019", 4 pgs.

* cited by examiner

MITIGATING DEVICE VULNERABILITIES IN SOFTWARE

TECHNICAL FIELD

Embodiments discussed herein regard devices, systems, and methods for reducing a likelihood that a device will be affected adversely.

BACKGROUND

Cyber security of embedded devices, such as televisions, Internet of Things (IoT) devices, refrigerators, toaster ovens, microwave ovens, vehicles, whether airborne, land vehicles, or watercraft, missiles, or other embedded devices that are not subject to information technology policies or permissions, is largely ignored. These devices, however, are still susceptible to cyber attack.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
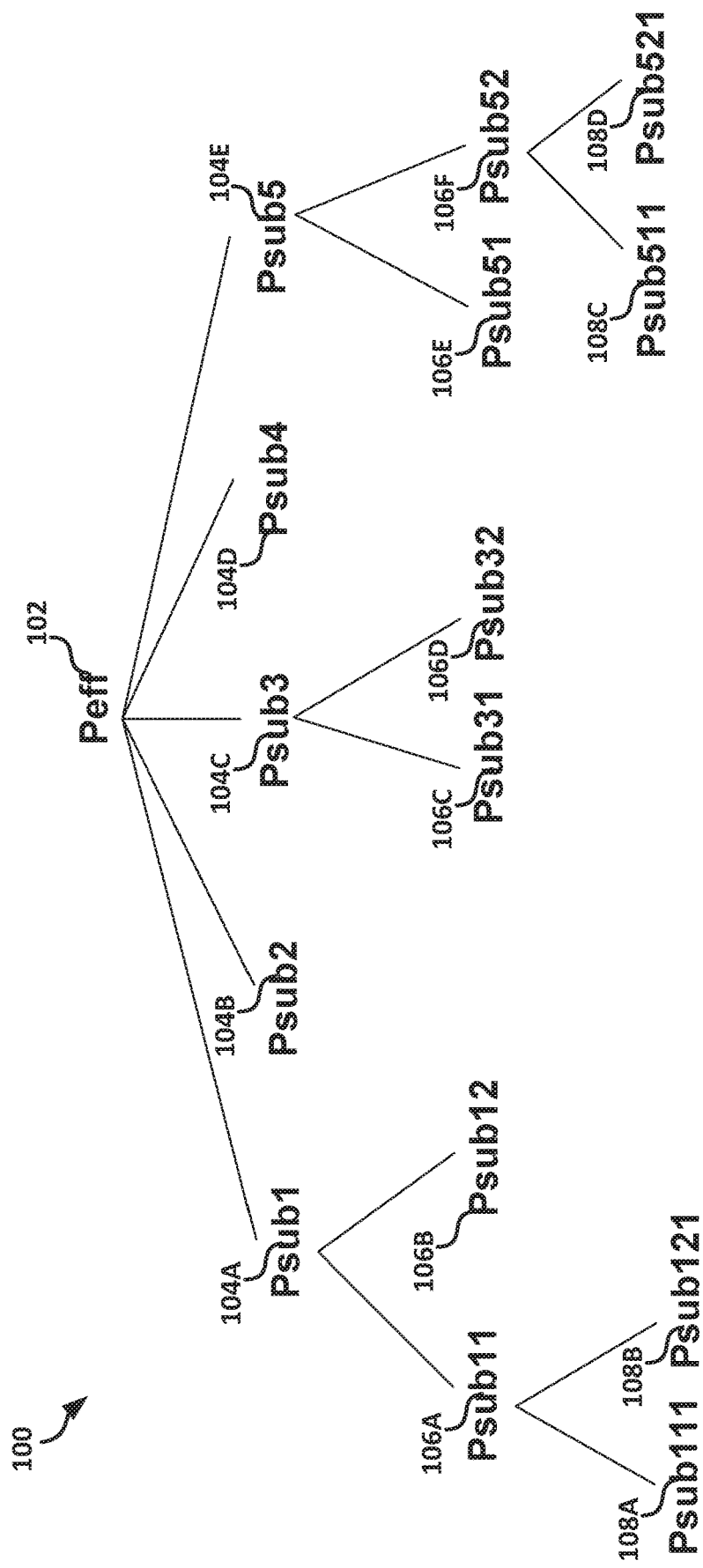
FIG. 1 illustrates, by way of example, a diagram of an embodiment of a probability chain for an embedded device.

Embodiments generally relate to devices, systems, and methods for reducing a likelihood that a device will be affected adversely by a cyberattack.

The "Official (ISC)² Guide to the CISSP CBK", Fourth Edition, Auerbach Publications Boston, Mass., USA ©2015 at page 314 (herein CISSP guide) provides a definition for embedded systems:

"Embedded systems are used to perform computing services in a small form factor with limited processing power. They embed the necessary hardware firmware and software into a single platform that can be used to provide limited range of computing services, usually around a single application. They typically feature a limited OS with the base minimum functionality required to meet its functional requirements."

The CISSP guide further explains why security is generally limited in embedded systems:

"From the security architect perspective, embedded systems have a number of potential advantages and disadvantages. Security services tend to be simple, testable and verifiable, making the task of ensuring that security has been designed and implemented correctly much simpler. Unfortunately, security in such systems is typically limited to a few basic security features to help protect memory and privileged access to memory. While they may be able to support a wide range of security services, they have limited processing power that must be shared by the core functions, particularly when richer functionality is the primary business driver. It is also frequently more difficult to patch security vulnerabilities in constrained embedded devices. This is why the security architect needs to consider where security needs to be placed and how it needs to be addressed BOTH inside and outside of the embedded system, as well as how much trust can be placed in the integrity of the embedded system from an architect stand point"

An embedded device is one that includes a special-purpose computing system. The computing system is entirely a part of the embedded device and the embedded device does not rely on data external to the embedded for operation. That does not mean that the computing system cannot receive feedback (e.g., from a sensor of the embedded device), be programmed, or receive other external information, but rather that control of the device is entirely within the computing system or other components of the device.

Cybersecurity controls come from the information assurance branch of IT. Real-world cares include primary concerns and secondary concerns. Examples of primary concerns include confidentiality, integrity, and availability. Examples of secondary concerns include non-repudiation, authenticity, accountability, and reliability.

Embodiments can provide cyber security in an embedded system. A problem addressed by embodiments can include providing a quantitative analysis of a system by tracing system performance driver; (e.g., key performance indicators (KPI)) to components that affect the system performance drivers. The components that affect the system performance drivers can include one or more of hardware, software, or firmware. After quantitative identification of an effect of the component on the system performance driver, the effect of the component on an overall mission (e.g., proper operation of an embedded device) can be assessed and prioritized. For a component (e.g., one or more hardware, software, or firmware components) that is determined to affect the system greater than a threshold amount, a cyber security measure can be implemented to help guarantee that the component operates to help ensure mission success. For example, a physical security measure can be added to the embedded device, such as a Faraday cage, a more robust component that is less affected by noise can be used in place of a component more susceptible to noise, a software/firmware monitor can cause the device to cease operation, if continued operation is compromised, a processing device can implement a cyber security protocol to help ensure that the component operates properly, or the like.

Industry standards for cybersecurity have their roots in information assurance for standard IT systems that are not embedded devices (e.g., desktop computers, cloud servers, printers, laptops, telephones, routers, firewalls, or other devices that connect to a network gateway). While embedded systems have needs for cybersecurity, an application of current IT information assurance practices to embedded systems (e.g., televisions, missiles, home appliances, Internet of Things (IoT) devices, or the like) leads to a nebulous process that is difficult to scope. For example, what does it mean to apply non-repudiation between two functions running within a single field programmable gate array (FPGA)?

Embodiments can use system performance parameters, tracked in the performance domain, and use them in the security domain. These embodiments provide a data-driven technique useful for cyber security in embedded systems and allows for scoping of the cybersecurity needs of the system.

Assessment of mission success is a qualitative exercise largely based on experience and expert opinion. Embodiments can provide a quantitative measurement that provides a focus on device effectiveness and failure modes. Some components of embodiments include probability assessment and a traceability assessment that takes the top-level requirements and traces them down to elements (e.g., one or more components of the device or external effects) that are important to operation of the device. The system performance parameter analysis identifies hardware, firmware, or software elements that have a greatest effect on the embedded device's probability of operating properly. Those identified elements can then be assessed further for security, resiliency, and/or reliability. Once completed, a probability assessment can reveal an impact of making changes to operation of the device. Embodiments can help differentiate robust systems that have already been assessed and have a quality pedigree.

Embedded systems (e.g., televisions, vehicles, missiles, Internet of Things (IoT), industrial control devices, smoke or carbon monoxide detectors, other home appliances, etc.) are not information technology (IT) systems, but are graded as IT systems by current cybersecurity policy. IT administrators or other personnel generally do not understand information security constraints of embedded systems, so cyber specialists are not well poised to address embedded systems. Fixing this issue can help allow fact-based scoping of cybersecurity efforts, such as by allowing risk-based analysis.

An advantage of embodiments can include showing how, why, and when embedded systems are vulnerable to cyber effects and how severe the cyber effects can be to device operation. The embodiments can thus identify components that can benefit from some level of cyber protection, such as to help ensure proper device operation. Embodiments solve a problem of determining how to provide cyber security for an embedded system by: i) identifying components and how the components operation of a device; ii) assessing performance risk against potential cyber vulnerabilities; and iii) scoping a level of effort to address an identified vulnerability based on a desired outcome; and iv) models can be used for other purposes (e.g., obsolescence studies, design reuse, etc.

Customer supplied cybersecurity guidelines are developed primarily for interconnected systems of devices, not individual devices, such as embedded systems. By their nature, embedded devices typically have only elements that are needed for device operation. Limited by size, weight, and power, applying comprehensive IT infrastructure cybersecurity approaches to embedded systems is unaffordable, impractical, and difficult to scope. Embodiments provide data-driven techniques to help define and prioritize cybersecurity scope for embedded systems in a cost-effective and practical manner.

Embodiments can trace the probability of embedded device effectiveness ($P_{DE}$) to identify hardware, software, and firmware components that impact $P_{DE}$. Embodiments can rank critical components against each other based on impact to $P_{DE}$. This data-driven approach can provide a prioritized set of components for cybersecurity monitoring and/or protection. Embodiments can provide affordable, risk-based, data-driven cybersecurity, such as in the context of embedded system performance. By prioritizing components, embodiments create an understanding of security risk in the context of the device bottom line, $P_{DE}$. Embodiments can allow for trade space analysis when optimizing security and performance in an embedded system where limited size, limited weight, and limited power are often driving considerations.

Embodiments can proactively address design evolution, design reuse, part obsolescence, or evolving attack issues. Embodiments can be used as a predictive tool to assess developing threats against an existing design, or developing threats against potential design upgrades or changes. As previously discussed, most embedded systems designers are ignorant of what cybersecurity requirements are reasonable or needed on an embedded device. Thus, the word "cybersecurity" can be perceived as risky and nebulous, because it seemingly has no bounds.

Embodiments can help solve the bounding problem by tracing $P_{DE}$ to components, identifying the components that most effect $P_{DE}$, when, why, and how the components effect $P_{DE}$, and guide efforts to help ensure that $P_{DE}$ remains above a threshold for a range of internal and external conditions. Currently, there is no tool that addresses analyzing the cybersecurity needs of embedded systems in a logical, ordered, and fact-based manner that is driven by parameters that are already of concern to a device designed, namely performance parameters.

As used herein a measure is a concrete objective attribute. As used herein a metric is an abstract, somewhat subjective attribute. For example, a number of systems that have been patched is a measure and how well a system is secured is a metric. In the topic of embedded system cybersecurity (CS), two questions of relevance include: (i) How are measures selected that correlate to real world results/utility? (ii) How are measures weighted to roll up into a metric?

A weapon is an embedded system and a cyber-physical system. A desktop computer is neither. Current cyber rules and metrics do not recognize, understand, or operate using requirements relevant to embedded/cyber-physical systems. For example, in an embedded system that is a weapon, neither desktop computers nor web servers have requirements to survive a 10 hour −70 C cold soak followed by a 30 minute warming cycle up to −35 C, and then be expected to be operational in 30 milliseconds and meet all performance requirements, while being subjected to an alternating sinusoidal +/−3 g load and simultaneously experiencing a decompression from 14 pounds per square inch absolute (psia) to 2 psia at a rate of 4 psia/min. Industry (e.g., defense industry, automotive, appliance manufacturer, medical device, or other embedded device industry) does not have a clear path to show how IT based cyber rules apply to embedded systems in general. This leaves a fuzzy, complex, and risky environment.

External parameters and internal system design drive embedded system performance. For example, heat, shock, vibration, time, power quality, electromagnetic interference (EMI) environments, at least in part, drive cyber-physical system performance. In another example the layout of electric/electronic components, connections therebetween, the operating requirements of the electric/electronic components, also drive embedded system performance.

Key performance parameters (e.g., $P_{kill}$ in the case of a weapon, or more generally $P_{DE}$ in the context of embedded devices generally) can be determined using embedded device simulations. In general, $P_{DE}$, is an embedded system metric that drives embedded system design. $P_{DE}$ is a weighted rollup of other metrics and includes measurements of mission environment and execution. Higher fidelity simulations can include processor function logic. The processor function logic is software running in hardware. Software running in hardware is in the cyber domain, and thus in the cybersecurity domain.

Embodiments can: tie software, firmware, and hardware to one or more performance parameters affecting $P_{DE}$; identify which critical components affect the mission; identify when critical components affect the mission; and identify an effect of critical components of the mission. The mission can include device operation. Device operation can be wide ranging: a television connecting to the interact and streaming content onto a screen, receiving a signal from an antenna and producing the content corresponding to the signal, a phone completing a phone call or connecting to the internet and displaying content, a microwave interpreting input and properly heating an object in the microwave, a Bluetooth speaker connecting with a device and providing audio through the speaker, a weapon being incident on a target and being effective to achieve the desired destruction, a vehicle navigation system connecting to a global positioning system (GPS) and providing instructions to a user in navigating to a destination. Other examples of embedded devices include medical implant devices, home security systems, heating, ventilation, and air conditioning (HVAC) systems, industrial control systems, among many others FIG. 1 illustrates, by way of example, a diagram of an embodiment of a probability chain 100 for an embedded device. The probability chain 100 as illustrated includes an ultimate probability 102, that depends on multiple sub-probabilities 104A, 104B, 104C 104D, and 104E. Some of the multiple sub-probabilities 104A, 104C and 104E further depend on further sub-probabilities 106A, 106B, 106C, 106D, 106E, and 106F. Some of the further sub-probabilities 106A and 106F depend even further on further sub-probabilities 108A, 108B, 108C and 108D.

$P_{eff}$ in FIG. 1 represents a specific metric of interest, generically called $P_{DE}$ elsewhere herein. $P_{eff}$ 102 can be determined by a computer simulation that accounts for device physics (e.g., electrical, mechanical, thermal, chemical, or the like), or an environment external to the embedded device (e.g., EMI, weather, or the like). Simulations are simple to highly-detailed computer models of system components, the physics that govern operation of the components, the physics that govern the environment in which the component or device is operating, data communication, power, and timing, or the like. Examples of models commonly used for weapons include scene generation, a seeker sensor model, a flyout model, a target model, and an environmental model (e.g., wind, weather, temperature, pressure, or the like).

Scene generation includes models with measured and controlled environmental variables that mimic the real geographical environment. Examples of scene generation models include GALA and OCEANUS from Computational Physics, Inc. of Springfield, Va., United States of America (USA). A flyout model mimics a missile or other airborne object trajectory within a given scene. A seeker/sensor model mimics a physical flow of data through a system, such as a radar, infrared, ultraviolet, or other system. A target model mimics operation of a target of device operation. The target model can be used in weapons, communication, or other embedded device operation. An environmental model mimics an external environment (e.g., wind, weather, temperature, pressure, or the like) to the embedded device. These models can be used individually or in combination to determine a component's effect on an effectiveness of a corresponding device.

$P_{eff}$ 102 represents a likelihood that an operation or result desired from the embedded device will be performed. What $P_{eff}$ 102 represents is thus the probability of the embedded device effectiveness for a metric of interest. By following a leg down the probability tree (e.g., from Peff 102, to sub-probabilities 104A-104E, to their termination at the sub-probabilities 1108A-108D), subsystems or components that affect that branch can be identified. By following a leg up the probability tree (e.g., from a sub-probability 108A-108D, to sub-probability 104A-104E or to $P_{eff}$ 102), For example, consider an embodiment in which $P_{eff}$ 102 represents a likelihood that a missile will hit a desired target. In such an embodiment, the sub-probabilities 104A-104E can represent, for example: a probability that the target is acquired, a probability the missile will track an acquired target, a probability that the missile flies accurately to the target, a probability that the missile senses the target, and a probability that the missile fuzes (e.g., detonates), respectively. The ultimate probability 102 is thus a metric and is a rollup of other metrics, represented by sub-probabilities 104A-104E.

The sub-probabilities 104A-104E further depend on other sub-probabilities 106A-106F. For example, in an embodiment in which the sub-probability 104A represents a probability that the missile acquires, the sub-probabilities 106A and 106B can represent a probability of cue (e.g., from an external radar) and a probability of seeker searching for the target based on said cue, respectively. The sub-probabilities 108A-108D are further examples of measures that can be rolled up into the metrics 106A-106F. The sub-probability 108A can represent the ability of the external radar to operate in inclement weather, and the sub-probability 108B can represent the ability of the external radar to operate in the presence of EMI (e.g., jamming).

While probability tree 100 has been partially described with regard respect to a specific device (a missile), it is evident that probability tree 100 can represent the probability of device effectiveness for any embedded device. Further, the structure of the tree 100 depends on the structure of the embedded device, the environment in which the device operates, and the performance metrics or measures of interest.

By following down a specific $P_{DE}$ branch, the components and their performance contribution to the penultimate sub-metric (e.g., the metric at the second highest level, one of the sub-probabilities 104A-104E in the example of FIG. 1) can be determined. The resulting measure results, when compared to a defined acceptable risk level (e.g., a threshold probability), identifies the relative value of applying cybersecurity countermeasures to corresponding components. In other words, this process embodiment identifies the value (e.g., time, effort, or money that might be worth investing) of implementing cybersecurity countermeasures relative to the performance of the system in the context of acceptable performance risk. This enables an understanding of the relative value of applying cybersecurity countermeasures in the context of one or more performance measures.

In sonic cases, an assessment can identify that cybersecurity implementation costs far exceed the value of what that implementation is designed to protect. Using the example above, it may be determined based on system performance modeling and testing that the value of implementing restrictive cybersecurity on the missile cuing radar and tracking software may have great impact to mission performance, while expending the same level of effort on the rocket motor squib circuit has almost no effect on the mission performance. In this example, even if the initial thought was that extensive cybersecurity was needed on all subsystems, the embodiment may show that a very targeted implementation approach balances the mission performance risk with the implementation costs.

Embodiments can identify a nature of a risk relative to operational life of the embedded system. The nature of the effect can include a time at which the component is important, a trigger condition which causes the component to perform or cease an operation, or environmental effects (electrical, heat, mechanical, vibration) that can impact the proper operation of the component in performing, or the like. The characteristics that correspond to proper operation can include ranges of voltages, current, resistance, frequency, vibration environment, thermal load, or the like.

Cybersecurity measures can include monitoring the component at the time, in response to determining the trigger condition has been met, or at all times, to determine whether the characteristics correspond to proper operation or not. In response to determining that the characteristics do not correspond to proper operation of the component, one or more countermeasures can be taken. The cybersecurity countermeasures taken can counteract threats identified in the threat modeling exercise that identifies the threats, vulnerabilities, and risks that those vulnerabilities will be exploited by a threat agent. A risk is a probability of a threat exploiting a vulnerability. A countermeasure can be put in place to lower the risk of threat.

There are three primary information assurance parameters used in cybersecurity controls: confidentiality (e.g., insuring that only the right people have access to the information), integrity (e.g., users having access can trust the information), and availability (e.g., information is there when they need it). Coming from the IT world, basic assumptions include: information systems are located in physical facilities; information is relatively persistent; information systems are multi-user (either serially or concurrently) in operation; some information is not shareable with other users who have authorized access; the information systems exist in networked environments; and the information system is general purpose in nature. Embedded systems violate many of these assumptions: embedded systems are forward deployed and generally not protected by physical security; information is loaded as needed and typically resides in volatile memory; there are no "users"; embedded systems typically involve specific, well-defined information with the world outside the embedded device; networking may be an invalid assumption for embedded devices—standalone operations are common; embedded systems are specific (rather than general) purpose systems and have custom rather than general purpose software; embedded system support is either non-existent (e.g., a toaster oven) or is operated/maintained by a large logistics chain (e.g., missiles).

Other general cybersecurity sub-parameters of interest include authentication (e.g., is this the right operator? or is this the right network with which to communicate?) and non-repudiation (e.g., the user is unable to deny that they were the source/origin of data or commands). The importance of these to embedded systems may have little or no value. For example, authenticating a soldier in combat prior to allowing the trigger to be pulled is of dubious value and can get that soldier killed. Implementing cybersecurity controls means putting manual and automated systems in place to assure confidentiality, integrity, availability, authentication, non-repudiation, etc.

Embedded systems by their nature usually lack the internal resources or operational timelines to perform these functions. Imposing them as requirements on the design can be done only when it is necessary to ensure the function of the overall system goals. The embodiments demonstrate a process whereby this is achievable.

Missiles are a specific kind of embedded system that can benefit from cybersecurity techniques. The cybersecurity techniques can be applied to preserve the mission effectiveness of the missile in a cyber-contested environment. Embodiments can use key performance parameters in the performance domain and re-purpose them for use in security analysis. Probability-of-success (Ps) (e.g., probability-of-kill (Pk), probability of fuze (Pfuze), or the like), is dependent on hardware, software, and/or firmware components. The embodiments identify an operational process that identifies and scopes what components can benefit from protection, and when the component is to be protected. Embodiments can assume multiple analysis to cover more than one operational scenario, such as to cover operational states/modes of the system. By, at least in part, understanding a relationship of why components need to be protected, embodiments can automatically scope the level of effort appropriate to protect Ps. Techniques can convert a technical understanding into a risk posture that can be assessed to appropriately scope security domain issues, in this case cybersecurity. This process has the inherent feature of being able to evolve with the design (to for instance address obsolescence issues), or to be used as a predictive tool to assess developing threats on an existing design.

Figure 2:
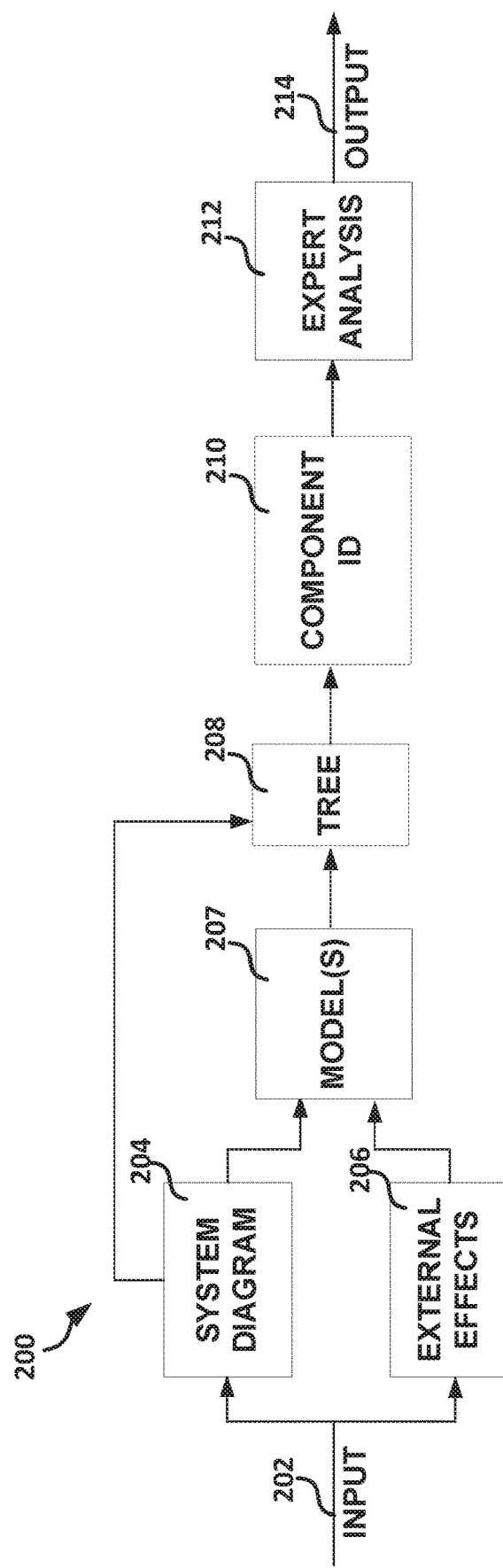
FIG. 2 illustrates, by way of example, an embodiment of a system for implementing cybersecurity in an embedded device.

FIG. 2 illustrates, by way of example, an embodiment of a system 200 for implementing cybersecurity in an embedded device. The system 200 as illustrated includes input 102, a system diagram 204, external effects 206, model(s) 207, a probability tree 208, component identification 210, expert analysis 212, and output 214. The input 102, can include one or more schematic diagrams of: a circuit, a component, a package of the component, software or firmware, or the like. The input 102 can include: a description of a geographical region (e.g., images of a geographical region, a three-dimensional point cloud of a geographical region), weather related data (e.g., temperature, pressure, wind, precipitation, depth charts, fluid flow diagrams, such as can be altitude or depth specific, or the like), or the like.

The system diagram 204 and/or external effects 206 can be provided as part of the input 202 or determined based on the input 202. The system diagram 204 details electrical connections between components and/or operations performed by programmable components of all the components of an embedded device or a subsystem of the embedded device. The external effects 206 detail an environment to be simulated by the model(s) 207. The external effects 206 can include geographical factors (e.g., contours of a region in which the embedded device or subsystem is to operate). The external effects 206 can include weather related effects, fluid dynamics, or other details regarding an external environment to be simulated around the embedded device or subsystem.

The model(s) 207 are produced by processing circuitry that takes the system diagram 204 and the external effects 206 as input. The model(s) 207 simulate operation of the embedded device or subsystem in the external environment. In many embodiments, multiple simulations are performed with respective, varying external environments. In sonic embodiments, data farming can be performed to build a knowledge base of operation of the subsystem or embedded device in a variety of external environments. Data farming includes performing a variety of simulations to grow the knowledge base. One or more of a grown knowledge base, or results of simulating the model(s) 207, can then be analyzed to determine, at least in part, probabilities of the probability tree 208.

The probability tree 208 can be deciphered based on the system diagram 204 or results of the model(s) 207. Connections in the system diagram 204 can help determine connections in the probability tree 208. For example, if subsystem A is connected to subsystem B, there can be a connection in the probability tree 208 between subsystem A and subsystem B. In another example, there can be no direct or indirect connection between subsystem A and subsystem B, but it can be determined, based on results of simulations, that subsystem A only operates in response to proper operation of subsystem B. In such an example, there can be a connection between the subsystem A and the subsystem B in the probability tree 208. The probability tree 100 is an example of the probability tree 208.

The component identification 210 can include determining components that are associated with probabilities greater than, or equal to, a specified threshold. The specified threshold can be application-dependent. In sonic applications, even a small effect on $P_{eff}$ 102 can indicate a component that can benefit from cybersecurity protection. For example, a toaster oven can have a higher specified threshold than a missile.

The expert analysis 212 includes a review of the identified components by the component identification 210 and the probability tree 208. The expert analysis 212 determines which one or more components will be monitored for cybersecurity concerns, how the components will be monitored, when the components will be monitored, or which components will not be monitored. The output 214 includes the results of the expert analysis 212. The output 214 can then be used to implement cybersecurity measures on the components identified by the output 214.

Figure 3:
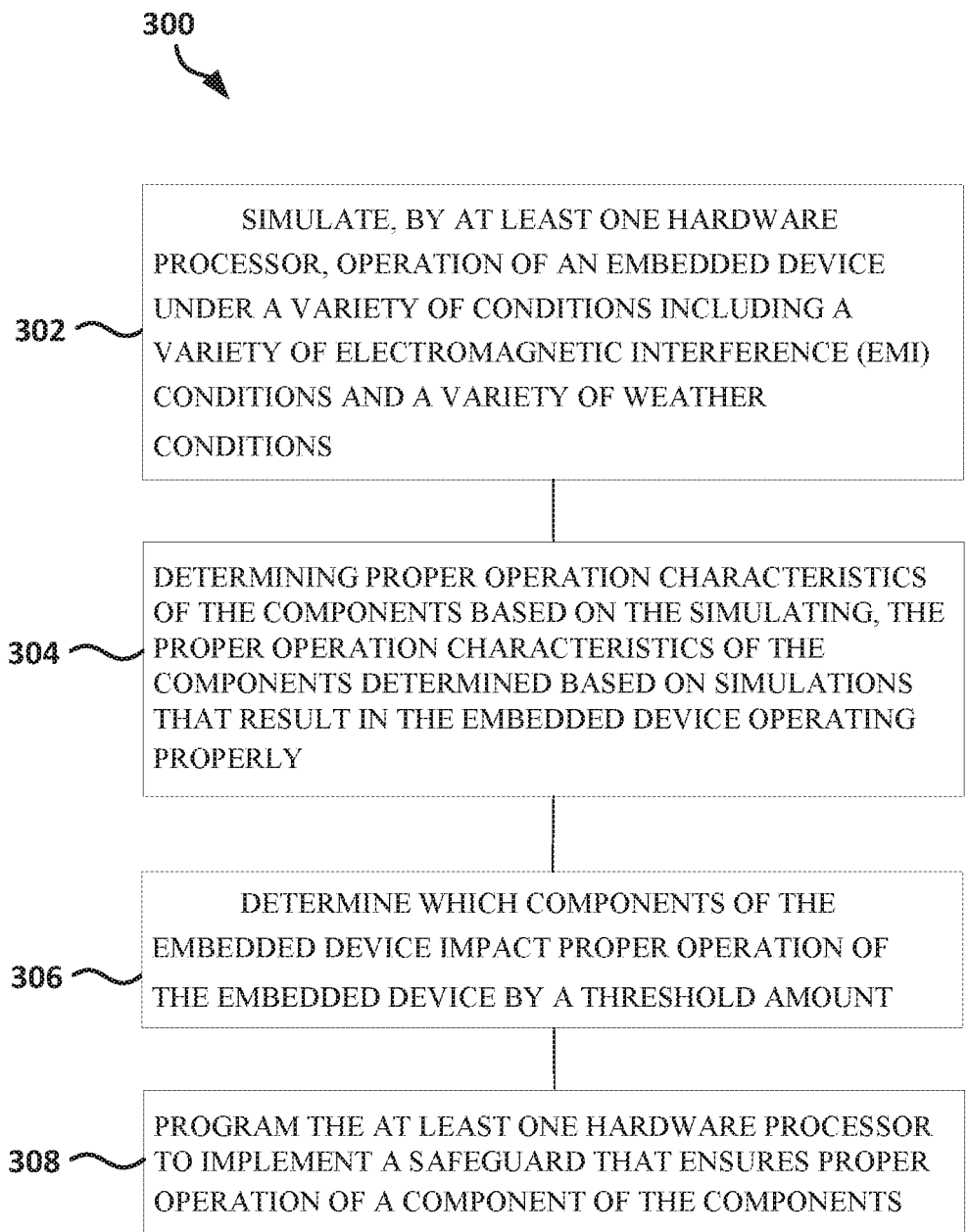
FIG. 3 illustrates, by way of example, an embodiment of a method for cybersecurity of an embedded system.

FIG. 3 illustrates, by way of example, an embodiment of a method 300 for cybersecurity of an embedded system. The method 300 as illustrated includes, simulating, by at least one hardware processor, operation of an embedded device under a variety of conditions including a variety of electromagnetic interference (EMI) conditions and a variety of weather conditions, at operation 302; determining proper operation characteristics of the components based on the simulating, the proper operation characteristics of the components determined based on simulations that result in the embedded device operating properly, at operation 304; determining which components of the embedded device impact proper operation of the embedded device by a threshold amount, at operation 306; and programming the at least one hardware processor to implement a safeguard that ensures proper operation of a component of the components, at operations 308.

The method 300 can further include, wherein the embedded device is configured to execute only a single application. The method 300 can further include, wherein the simulation includes tracing a key performance indicator (KPI) to components of the embedded device that affect the KPI, determining an amount the components affect the KPI, determining a likelihood that the component causes the embedded device to perform an improper operation, and wherein the component is determined to affect the KPI by a threshold amount.

The method 300 can further include, wherein the embedded device is a missile. The method 300 can further include determining a component of the components has no impact on proper operation of the embedded device and removing the component from the embedded device. The method 300 can further include analyzing a probability tree produced by the simulation, the probability tree indicating a proper operation of the embedded device as a root node and components or subsystems as respective leaf nodes, wherein a value associated with a leaf node indicates an amount that the component contributes to proper operation of the embedded device.

The method 300 can further include further simulating operation of the embedded device with a cyber security measure that helps ensure proper operation of a component of the embedded device determined to contribute to proper operation of the embedded device by more than a threshold amount, generating another probability tree based on the embedded device with the added cyber security measure, and altering the embedded device to include the cyber security measure in response to determining the added cyber security measures changes the amount the component contributes by more than a threshold amount.

Using an embodiment of the method 300 that includes a model allowing "what if" analysis, can provide for an understanding of effects of malfeasance. For example, consider a zero-day attack in the that can have undesirable effect. The model can emulate the zero-day attack and determine whether the zero-day attack is a bad thing that needs to be mitigated, or if the rest of the embedded system provides sufficient resiliency to withstand the effects of the attack. For example, if a buffer overflow causing memory corruption is emulated, does a guard function identify this, reset the memory, and recover the embedded system, or does it "blue screen"?

A feature of embodiments is an ability to run what-if scenarios to help assure that whole classes of attacks may be ineffective on the embedded systems, changing the perceived risk posture without investing a lot of resources into testing. This is a powerful, game changing approach for cybersecurity in embedded systems.

Figure 4:
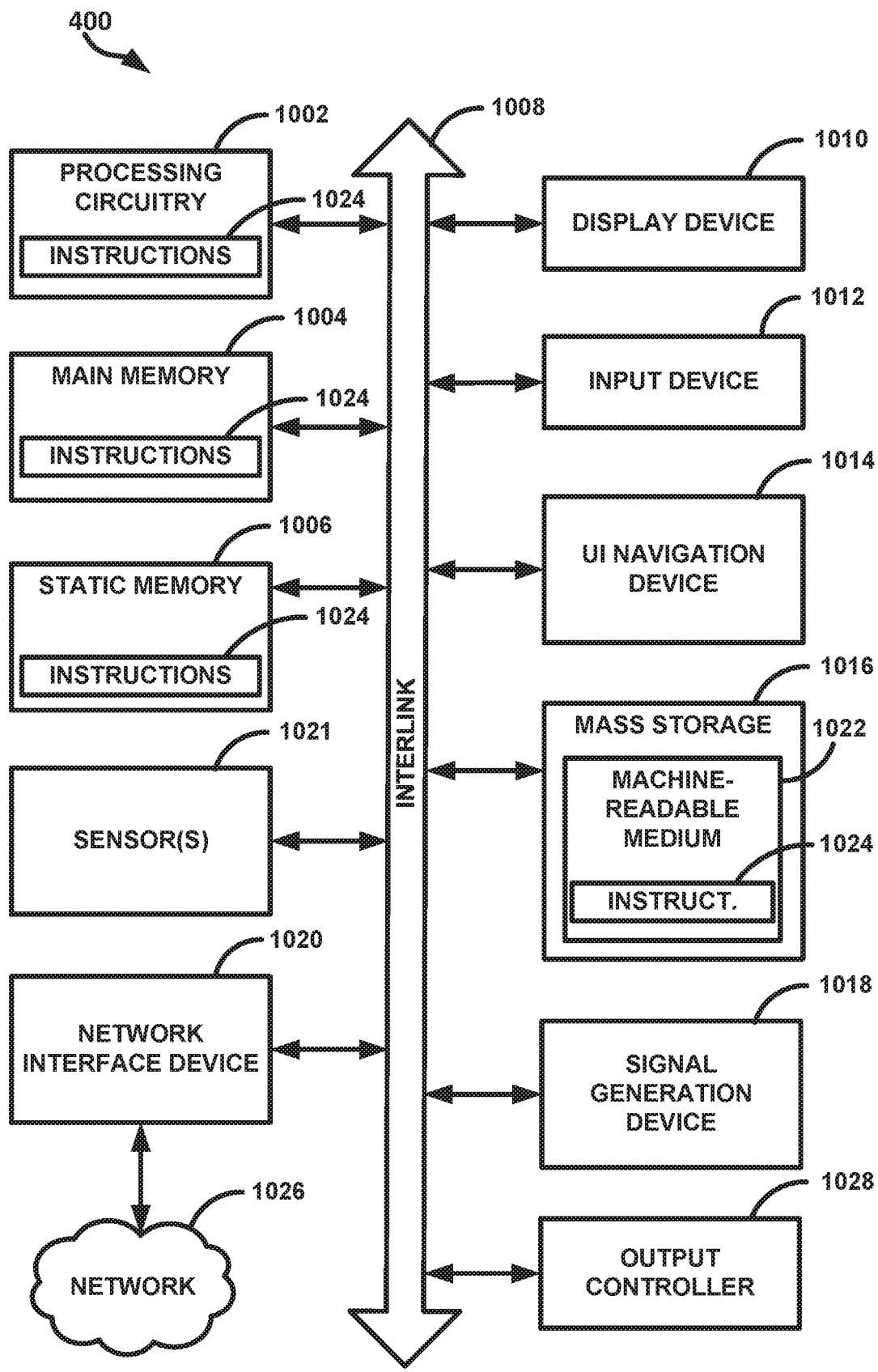
FIG. 4 illustrates, by way of example, a block diagram of an embodiment of a machine on which one or more of the methods, such as those discussed about FIG. 3 and elsewhere herein can be implemented.

FIG. 4 illustrates, by way of example, a block diagram of an embodiment of a machine 400 on which one or more of the methods, such as those discussed about FIG. 3 and elsewhere herein can be implemented. In one or more embodiments, one or more items of the system 200 can be implemented by the machine 1000. In alternative embodiments, the machine 400 operates as a standalone device or may be connected (e.g., networked) to other machines. In one or more embodiments, one or more items of the system 200 can include one or more of the items of the machine 400. In a networked deployment, the machine 400 may operate in the capacity of a server or a client machine in server-client network environment, or as a peer machine in a peer-to-peer (or distributed) network environment. The machine 400 may be a personal computer (PC), a tablet PC, a set-top box (SIB), a Personal Digital Assistant (PDA), a cellular telephone, a web appliance, a network router, switch or bridge, embedded computer or hardware, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 400 includes processing circuitry 1002 (e.g., a hardware processor, such as can include a central processing unit (CPU), a graphics processing unit (GPU), an application specific integrated circuit, circuitry, such as one or more transistors, resistors, capacitors, inductors, diodes, logic gates, multiplexers, oscillators, buffers, modulators, regulators, amplifiers, demodulators, or radios (e.g., transmit circuitry or receive circuitry or transceiver circuitry, such as RF or other electromagnetic, optical, audio, non-audible acoustic, or the like), sensors 1021 (e.g., a transducer that converts one form of energy (e.g., light, heat, electrical, mechanical, or other energy) to another form of energy), or the like, or a combination thereof), a main memory 1004 and a static memory 1006, which communicate with each other and all other elements of machine 400 via a bus 1008. The transmit circuitry or receive circuitry can include one or more antennas, oscillators, modulators, regulators, amplifiers, demodulators, optical receivers or transmitters, acoustic receivers (e.g., microphones) or transmitters (e.g., speakers) the like. The RF transmit circuitry can be configured to produce energy at a specified primary frequency to include a specified harmonic frequency.

The machine 400 (e.g., computer system) may further include a, video display unit 1010 (e.g., a liquid crystal display (LCD) or a cathode ray tube (CRT)). The machine 400 also includes an alphanumeric input device 1012 (e.g., a keyboard), a user interface (UI) navigation device 1014 (e.g., a mouse), a disk drive or mass storage unit 1016, a signal generation device 1018 (e.g., a speaker) and a network interface device 1020.

The mass storage unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processing circuitry 1002 during execution thereof by the machine 400, the main memory 1004 and the processing circuitry 1002 also constituting machine-readable media. One or more of the main memory 1004, the mass storage unit 1016, or other memory device can store the job data, transmitter characteristics, or other data for executing the method 900.

The machine 400 as illustrated includes an output controller 1028. The output controller 1028 manages data flow to/from the machine 400. The output controller 1028 is sometimes called a device controller, with software that directly interacts with the output controller 1028 being called a device driver.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that can store, encode or carry instructions for execution by the machine and that cause the machine to perform any one or more of the methodologies of the present invention, or that can store, encode or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of several well-known transfer protocols (e.g., hypertext transfer protocol (HTTP), user datagram protocol (MP), transmission control protocol (TCP)/internet protocol (IP)). The network 1026 can include a point-to-point link using a serial protocol, or other well-known transfer protocol. Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that can store, encode or carry instructions for execution by the machine, and includes digital or analog communications signals or other intangible media to facilitate communication of such software.

Examples and Additional Notes

Example 1 can include an embedded device comprising an electronic component or software operation determined, based on at least one simulation, to affect a probability of the embedded device performing a proper operation by a specified threshold probability, a memory including data indicating proper operation characteristics of the electronic component or software including input values to and output values of the electronic component or software and a time frame associated with the proper operation characteristics, processing circuitry coupled to the electronic component and the memory, the processing circuitry configured to monitor an operation characteristic of the electronic component or software during the time frame and an input to the electronic component before and during the time frame, and in response to determining the monitored operation characteristic or the input is not within the proper operation characteristics, causing the electronic component to perform operations within the proper operation characteristics or causing the autonomous embedded device to cease operation.

In Example 2, Example 1 can further include, wherein the at least one simulation includes tracing a key performance indicator (KPI) to components of the embedded device that affect the KPI, determining an amount the components affect the KPI, determining a likelihood that the component causes the embedded device to perform an improper operation, and wherein the component is determined to affect the KPI by a threshold amount.

In Example 3, at least one of Examples 1-2 can further include, wherein the embedded device is a missile.

In Example 4, at least one of Examples 1-3 can further include, wherein the embedded device executes only a single application.

In Example 5, at least one of Examples 1-4 can further include, wherein the simulation includes a hierarchy of components that affect the proper operation of the embedded device.

In Example 6, at least one of Examples 1-5 can further include, wherein the simulation uses a key performance indicator probability tree.

Example 7 can include a method of implementing cybersecurity on an embedded device, the method comprising simulating, by at least one hardware processor, operation of an embedded device under a variety of conditions including a variety of electromagnetic interference (EMI) conditions and a variety of weather conditions, determining proper operation characteristics of the components based on the simulating, the proper operation characteristics of the components determined based on simulations that result in the embedded device operating properly, determining which components of the embedded device impact proper operation of the embedded device by a threshold amount, and programming the at least one hardware processor to implement a safeguard that ensures proper operation of a component of the components.

In Example 8, Example 7 can further include, wherein the embedded device is configured to execute only a single application.

In Example 9, at least one of Examples 7-8 can further include, wherein the simulation includes tracing a key performance indicator (KPI) to components of the embedded device that affect the KPI, determining an amount the components affect the KPI, determining a likelihood that the component causes the embedded device to perform an improper operation, and wherein the component is determined to affect the KPI by a threshold amount.

In Example 10, at least one of Examples 7-9 can further include, wherein the embedded device is a missile.

In Example 11, at least one of Examples 7-10 can further include determining a component of the components has no impact on proper operation of the embedded device and removing the component from the embedded device.

In Example 12, at least one of Examples 7-11 can further include analyzing a probability tree produced by the simulation, the probability tree indicating a proper operation of the embedded device as a root node and components or subsystems as respective leaf nodes, wherein a value associated with a leaf node indicates an amount that the component contributes to proper operation of the embedded device.

In Example 13, at least one of Example 12 can further include further simulating operation of the embedded device with a cyber security measure that helps ensure proper operation of a component of the embedded device determined to contribute to proper operation of the embedded device by more than a threshold amount, generating another probability tree based on the embedded device with the added cyber security measure, and altering the embedded device to include the cyber security measure in response to determining the added cyber security measures changes the amount the component contributes by more than a threshold amount.

Example 14 includes at least one non-transitory machine-readable storage device including instructions stored thereon that, when executed by a machine, configure the machine to perform operations of the method of at least one of Examples 7-13 or operations of the embedded device of Examples 1-6.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method of implementing cybersecurity on an embedded device, the method comprising:
   simulating, by at least one hardware processor, operation of an embedded device under a variety of conditions including a variety of electromagnetic interference (EMI) conditions and a variety of weather conditions;
   determining proper operation characteristics of the components based on the simulating, the proper operation characteristics of the components determined based on simulations that result in the embedded device operating properly and analyzing a probability tree produced by the simulation, the probability tree indicating a proper operation of the embedded device as a root node and components or subsystems as respective leaf nodes, wherein a value associated with a leaf node indicates an amount that the component contributes to proper operation of the embedded device;
   determining which components of the embedded device impact proper operation of the embedded device by a threshold amount;
   further simulating operation of the embedded device with a cybersecurity measure that helps ensure proper operation of the component of the embedded device determined to contribute to proper operation of the embedded device by more than the threshold amount;
   generating another probability tree based on the embedded device with the added cybersecurity measure; and
   altering the embedded device to include the cybersecurity measure in response to determining the added cybersecurity measures changes the amount the component contributes by more than a threshold amount.

2. The method of claim 1, wherein the embedded device is configured to execute only a single application.

3. The method of claim 1, wherein the simulation includes tracing a key performance indicator (KPI) to components of the embedded device that affect the KPI, determining an amount the components affect the KPI, determining a likelihood that the component causes the embedded device to perform an improper operation, and wherein the component is determined to affect the KPI by a threshold amount.

4. The method of claim 1, wherein the embedded device is a missile.

5. The method of claim 1, further comprising:
   determining a component of the components has no impact on proper operation of the embedded device and removing the component from the embedded device.

6. At least one non-transitory machine-readable storage device including instructions stored thereon that, when executed by a machine, configure the machine to perform operations comprising:
   simulating operation of an embedded device under a variety of conditions including a variety of electromagnetic interference (EMI) conditions and a variety of weather conditions;
   determining proper operation characteristics of the components based on the simulating, the proper operation characteristics of the components determined based on simulations that result in the embedded device operating properly and analyzing a probability tree produced by the simulation, the probability tree indicating a proper operation of the embedded device as a root node and components or subsystems as respective leaf nodes, wherein a value associated with a leaf node indicates an amount that the component contributes to proper operation of the embedded device;

determining which components of the embedded device impact proper operation of the embedded device by a threshold amount;

further simulating operation of the embedded device with a cybersecurity measure that helps ensure proper operation of the component of the embedded device determined to contribute to proper operation of the embedded device by more than the threshold amount;

generating another probability tree based on the embedded device with the added cybersecurity measure; and altering the embedded device to include the cybersecurity measure in response to determining the added cybersecurity measures changes the amount the component contributes by more than a threshold amount.

7. The non-transitory machine-readable storage device of claim 6, wherein the embedded device is configured to execute only a single application.

8. The non-transitory machine-readable storage device of claim 6, wherein the simulation includes tracing a key performance indicator (KPI) to components of the embedded device that affect the KPI, determining an amount the components affect the KPI, determining a likelihood that the component causes the embedded device to perform an improper operation, and wherein the component is determined to affect the KPI by a threshold amount.

9. The non-transitory machine-readable storage device of claim 6, wherein the embedded device is a missile.

10. The non-transitory machine-readable storage device of claim 6, wherein the operations further comprise:

determining a component of the components has no impact on proper operation of the embedded device and removing the component from the embedded device.

11. An embedded device analysis system comprising:

a memory;

processing circuitry coupled to the memory, the processing circuitry configured to:

simulate operation of an embedded device under a variety of conditions including a variety of electromagnetic interference (EMI) conditions and a variety of weather conditions;

determine proper operation characteristics of the components based on the simulating, the proper operation characteristics of the components determined based on simulations that result in the embedded device operating properly and analyzing a probability tree produced by the simulation, the probability tree indicating a proper operation of the embedded device as a root node and components or subsystems as respective leaf nodes, wherein a value associated with a leaf node indicates an amount that the component contributes to proper operation of the embedded device;

determine which components of the embedded device impact proper operation of the embedded device by a threshold amount;

further simulate operation of the embedded device with a cybersecurity measure that helps ensure proper operation of the component of the embedded device determined to contribute to proper operation of the embedded device by more than the threshold amount;

generate another probability tree based on the embedded device with the added cybersecurity measure; and alter the embedded device to include the cybersecurity measure in response to determining the added cybersecurity measures changes the amount the component contributes by more than a threshold amount.

12. The system of claim 11, wherein the embedded device is configured to execute only a single application.

13. The system of claim 11, wherein the simulation includes tracing a key performance indicator (KPI) to components of the embedded device that affect the KPI, determining an amount the components affect the KPI, determining a likelihood that the component causes the embedded device to perform an improper operation, and wherein the component is determined to affect the KPI by a threshold amount.

14. The system of claim 11, wherein the embedded device is a missile.

15. The system of claim 11, wherein the processing circuitry is further configured to determine a component of the components has no impact on proper operation of the embedded device and removing the component from the embedded device.

* * * * *

UNITED STATES PATENT AND TRADEMARK OFFICE
CERTIFICATE OF CORRECTION

| | | |
|---|---|---|
| PATENT NO. | : 10,698,753 B2 | Page 1 of 2 |
| APPLICATION NO. | : 15/958789 | |
| DATED | : June 30, 2020 | |
| INVENTOR(S) | : Fleischman et al. | |

It is certified that error appears in the above-identified patent and that said Letters Patent is hereby corrected as shown below:

On the Title Page

Item (73), in "Assignee", in Column 1, Line 1, delete "Ratheon" and insert --Raytheon-- therefor In the Drawings On sheet 1 of 4, Fig. 1, reference numeral 102, Line 1, delete "Peff" and insert --$P_{eff}$-- therefor In the Specification In Column 2, Line 32, delete "driver;" and insert --drivers-- therefor In Column 3, Line 44, delete "etc." and insert --etc.).-- therefor In Column 5, Line 10, delete "interact" and insert --internet-- therefor In Column 5, Line 25, after "others", insert --.--

In Column 5, Line 54, delete "GALA" and insert --GAIA-- therefor

In Column 6, Line 5, delete "Peff" and insert --$P_{eff}$-- therefor

In Column 6, Line 7, delete "1108A-108D)," and insert --108A-108D),-- therefor

In Column 6, Line 58, delete "sonic" and insert --some-- therefor

In Column 8, Line 31, delete "102," and insert --202,-- therefor

In Column 8, Line 34, delete "102," and insert --202-- therefor

Signed and Sealed this
First Day of March, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,698,753 B2

In Column 8, Line 37, delete "102" and insert --202-- therefor

In Column 8, Line 62, delete "sonic" and insert --some-- therefor

In Column 9, Line 21, delete "sonic" and insert --some-- therefor

In Column 10, Line 52, delete "(SIB)," and insert --(STB),-- therefor

In Column 11, Line 14, after "speakers)", insert --or--

In Column 11, Line 18, delete "a," and insert --a-- therefor

In Column 12, Line 4, delete "(MP)," and insert --(UDP),-- therefor